(12) United States Patent
Williams et al.

(10) Patent No.: US 12,169,141 B2
(45) Date of Patent: Dec. 17, 2024

(54) GRAVITY-ENFORCED PHOTON MOMENTUM RADIOMETER AND MEASURING OPTICAL POWER

(71) Applicant: Government of the United States of America, as represented by the Secretary of Commerce, Gaithersburg, MD (US)

(72) Inventors: Paul Andrew Williams, Erie, CO (US); Daniel Rahn, El Segundo, CA (US); Anna Katariina Vaskuri, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 378 days.

(21) Appl. No.: 17/831,736

(22) Filed: Jun. 3, 2022

(65) Prior Publication Data

US 2022/0390276 A1    Dec. 8, 2022

Related U.S. Application Data

(60) Provisional application No. 63/196,247, filed on Jun. 3, 2021.

(51) Int. Cl.
  *G01B 21/08*    (2006.01)
  *G01J 1/04*     (2006.01)
  *G01J 1/42*     (2006.01)

(52) U.S. Cl.
  CPC ............ *G01J 1/4257* (2013.01); *G01B 21/08* (2013.01); *G01J 1/0403* (2013.01); *G01J 1/0414* (2013.01)

(58) Field of Classification Search
  CPC ...... G01J 1/4257; G01J 1/0403; G01J 1/0414; G01B 21/08
  USPC ............ 356/218; 73/514.26, 514.16, 514.39, 73/514.18
  See application file for complete search history.

(56) References Cited

U.S. PATENT DOCUMENTS

| | | | |
|---|---|---|---|
| 3,597,022 A | 8/1971 | Waldron | |
| 10,754,059 B2 * | 8/2020 | Wodin | ...................... G01V 7/12 |
| 11,835,333 B2 * | 12/2023 | Gunawan | ............... G01B 11/26 |
| 11,835,711 B2 * | 12/2023 | Pelrine | ................. G02B 26/085 |

(Continued)

OTHER PUBLICATIONS

Pinot, P., et al., "Optical power meter using radiation pressure measurement", Measurement, 2019, p. 109-119, vol. 131.

(Continued)

*Primary Examiner* — Isiaka O Akanbi
(74) *Attorney, Agent, or Firm* — Office of Chief Counsel for National Institute of Standards and Technology

(57) ABSTRACT

A gravity-enforced photon momentum radiometer incudes: a magnetic array; a diamagnetic shuttle that levitates above the magnetic array; a mirror on the diamagnetic shuttle that receives laser light and moves the diamagnetic shuttle due to the optical force; a tiltable platform for the magnetic array; a photogate producing gate light that can be blocked by a photo interrupter and that produces a detector signal that provides a position of the diamagnetic shuttle relative to the tiltable platform for determining a position of the diamagnetic shuttle relative to the photogate.

20 Claims, 9 Drawing Sheets
(9 of 9 Drawing Sheet(s) Filed in Color)

(56) References Cited

U.S. PATENT DOCUMENTS

| | | | |
|---|---|---|---|
| 2005/0204817 A1* | 9/2005 | Boletis | G01C 9/00 73/652 |
| 2006/0162452 A1* | 7/2006 | Moser | G01P 15/131 73/514.39 |
| 2017/0299410 A1* | 10/2017 | Gunawan | H01F 7/0236 |
| 2019/0277998 A1* | 9/2019 | Wodin | G01V 7/12 |
| 2020/0333584 A1* | 10/2020 | Pelrine | H02N 15/00 |

OTHER PUBLICATIONS

Vaskuri, A.K., et al., "Absolute radiation pressure detector using a diamagnetically levitating test mass", Optica, 2021, p. 1380-1387, vol. 8 No. 11.

* cited by examiner

GRAVITY-ENFORCED PHOTON MOMENTUM RADIOMETER AND MEASURING OPTICAL POWER

CROSS REFERENCE TO RELATED APPLICATIONS

This application claims the benefit of U.S. Provisional Patent Application Ser. No. 63/196,247 (filed Jun. 3, 2021), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a gravity-enforced photon momentum radiometer for measuring optical power of laser light, the gravity-enforced photon momentum radiometer comprising: a magnetic array that produces a diamagnetic levitation force; a diamagnetic shuttle disposed proximate to the magnetic array such that the diamagnetic shuttle is in communication with the magnetic array and subjected to the diamagnetic levitation force from the magnetic array whereby the diamagnetic shuttle levitates above the magnetic array in response to the diamagnetic levitation force; a mirror disposed on the diamagnetic shuttle and that receives an incident optical force from the laser light and moves, in response to receipt of the incident optical force, the diamagnetic shuttle in a direction of propagation of the laser light; a tiltable platform on which is disposed the magnetic array, such that the magnetic array is interposed between the tiltable platform and the diamagnetic shuttle, wherein the tiltable platform positions the magnetic array at a tilt angle $\beta$ with respect to a reference platform, wherein tilt angle $\beta$ depends on an amount of the incident optical force received by the mirror, and tilt angle changes based on the amount of the incident optical force received by the mirror; a photogate comprising an optical source that transmits gate light and a detector that detects the gate light from the photogate and produces a detector signal based on the amount of the gate light detected, wherein the gate light is subject to being blocked by a photo interrupter, the amount of blocking by the photo interrupter being dependent upon the position of the diamagnetic shuttle relative to the photogate as modified by the amount of the incident optical force received by the mirror, such that the detector signal provides a position of the diamagnetic shuttle relative to the tiltable platform; and the photo interrupter disposed on the diamagnetic shuttle, and that moves relative to the photogate based on movement of the diamagnetic shuttle, and blocks the gate light as a function of the movement of the diamagnetic shuttle caused by receipt of the laser light by the mirror.

Disclosed is a process for measuring optical power of laser light with a gravity-enforced photon momentum radiometer, the process comprising: producing a diamagnetic levitation force by a magnetic array of the gravity-enforced photon momentum radiometer, the gravity-enforced photon momentum radiometer comprising: the magnetic array; a diamagnetic shuttle disposed proximate to the magnetic array such that the diamagnetic shuttle is in communication with the magnetic array; a mirror disposed on the diamagnetic shuttle; a tiltable platform on which is disposed the magnetic array, such that the magnetic array is interposed between the tiltable platform and the diamagnetic shuttle, wherein the tiltable platform positions the magnetic array at a tilt angle with respect to a reference platform, wherein tilt angle $\beta$ depends on an amount of the incident optical force received by the mirror, and tilt angle $\beta$ changes based on the amount of the incident optical force received by the mirror; a photogate comprising an optical source light and a detector; and the photo interrupter disposed on the diamagnetic shuttle; subjecting the diamagnetic shuttle to the diamagnetic levitation force from the magnetic array; levitating the diamagnetic shuttle above the magnetic array in response to the diamagnetic levitation force; receiving the laser light by the mirror; moving, the diamagnetic shuttle, in response to the mirror receiving the incident optical force of the laser light in a direction of propagation of the laser light; positioning, by the tiltable platform, the magnetic array at a tilt angle $\beta$ with respect to the reference platform, wherein tilt angle $\beta$ depends on an amount of the incident optical force received by the mirror; changing the tilt angle $\beta$ based on the amount of the incident optical force received by the mirror; producing, by the optical source of the photogate, gate light modulated at modulation frequency $f_m$; transmitting, from the optical source of the photo interrupter, the gate light; moving the photo interrupter relative to the photogate based on movement of the diamagnetic shuttle; blocking, with the photo interrupter, some or all of the gate light as a function of the movement of the diamagnetic shuttle caused by receipt of the laser light by the mirror; subjecting the gate light to being blocked by the photo interrupter, such that the amount of blocking by the photo interrupter depends upon the position of the diamagnetic shuttle relative to the photogate as modified by the amount of the incident optical force received by the mirror, detecting, by the detector of the photogate, the gate light; and producing, by the detector, a detector signal based on the amount of the gate light detected, such that the modulated detector signal provides the position of the diamagnetic shuttle relative to the tiltable platform; and determining, from the tilt angle that balances motion of the diamagnetic shuttle, the optical power of the laser light.

BRIEF DESCRIPTION OF THE DRAWINGS

The patent or application file contains at least one drawing executed in color. Copies of this patent or patent application publication with color drawings will be provided by the Office upon request and payment of the necessary fee.

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
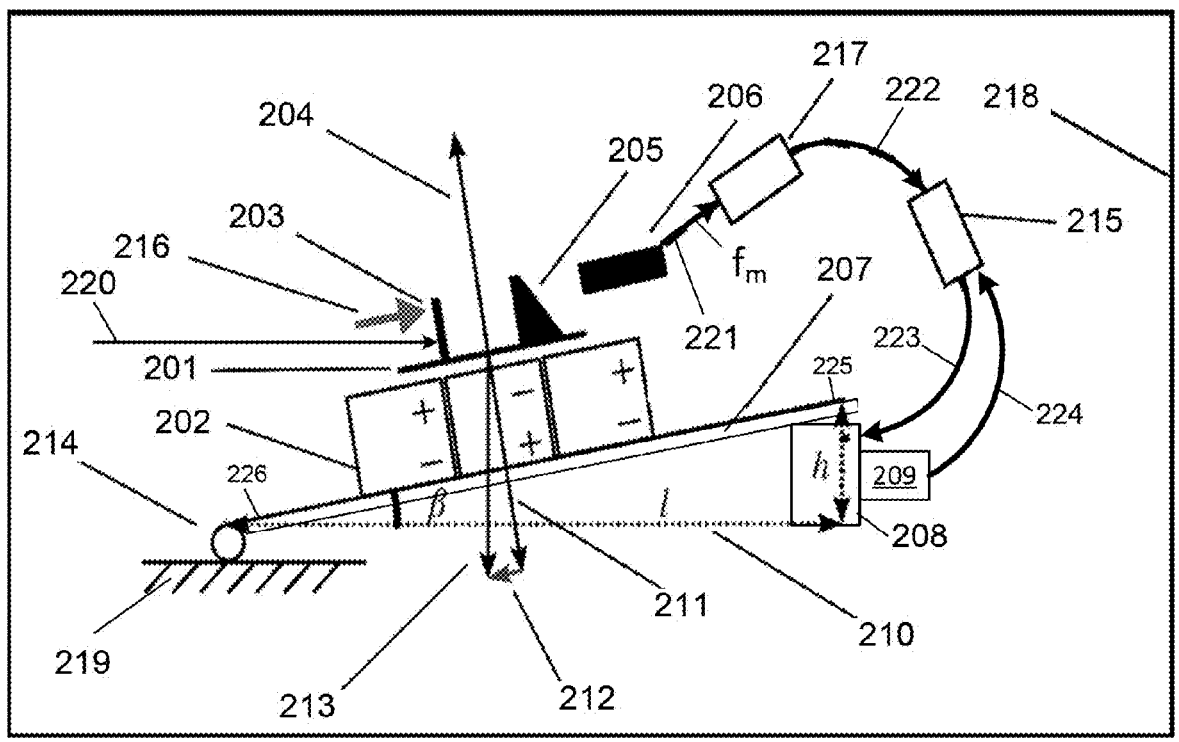
FIG. 1 shows a gravity-enforced photon momentum radiometer, according to some embodiments.
Figure 1:
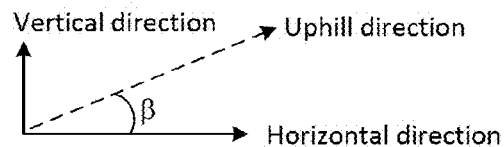

A detailed description of one or more embodiments is presented herein by way of exemplification and not limitation.

Conventional technologies fail to provide a simple, low-cost way to measure optical power of a laser from determining radiation pressure of light produced by the laser. The gravity-enforced photon momentum radiometer described herein overcomes this deficiency.

It has been discovered that a gravity-enforced photon momentum radiometer 200 described herein is an absolute detector that measures laser power from radiation pressure in a closed control-loop configuration and can include a diamagnetically levitated element as a soft spring interacting with gravity as a contactless restoring force. In certain embodiments, a laser beam impinges on a highly reflective mirror disposed on a levitating pyrolytic shuttle. The momentum of the light spatially displaces the shuttle, and its position is restored by tilting the magnet array, e.g., with a piezoelectric actuator. A closed-loop configuration avoids the need for accurate knowledge of the system spring constant or environmental dependencies of the diamagnetic levitation. Laser power is traceable to the shuttle system's mass, gravitational acceleration, and the tilt angle of the magnet array.

Gravity-enforced photon momentum radiometer 200 measures the optical power of laser light. In an embodiment, with reference to FIG. 1, FIG. 2, FIG. 5, and FIG. 6, gravity-enforced photon momentum radiometer 200 includes: a magnetic array 202 that produces a diamagnetic levitation force 204; a diamagnetic shuttle 201 disposed proximate to the magnetic array 202 such that the diamagnetic shuttle 201 is in communication with the magnetic array 202 and subjected to the diamagnetic levitation force 204 from the magnetic array 202 whereby the diamagnetic shuttle 201 levitates above the magnetic array 202 in response to the diamagnetic levitation force 204; a mirror 203 disposed on the diamagnetic shuttle 201 and that receives an incident optical force 216 from the laser light 220 and moves, in response to receipt of the incident optical force 216, the diamagnetic shuttle 201 in a direction of propagation of the laser light 220; a tiltable platform 207 on which is disposed the magnetic array 202, such that the magnetic array 202 is interposed between the tiltable platform 207 and the diamagnetic shuttle 201, wherein the tiltable platform 207 positions the magnetic array 202 at a tilt angle β with respect to a reference platform 219, wherein tilt angle β depends on an amount of the incident optical force 216 received by the mirror 203, and tilt angle β changes based on the amount of the incident optical force 216 received by the mirror 203; a photogate 206 comprising an optical source that transmits gate light and a detector that detects the gate light from the photogate and produces a detector signal 221 based on the amount of the gate light detected, wherein the gate light is subject to being blocked by a photo interrupter 205, the amount of blocking by the photo interrupter 205 being dependent upon the position of the diamagnetic shuttle 201 relative to the photogate 206 as modified by the amount of the incident optical force 216 received by the mirror 203, such that the detector signal provides a position of the diamagnetic shuttle 201 relative to the tiltable platform 207; and the photo interrupter 205 disposed on the diamagnetic shuttle 201, and that moves relative to the photogate 206 based on movement of the diamagnetic shuttle 201, and blocks the gate light as a function of the movement of the diamagnetic shuttle 201 caused by receipt of the laser light 220 by the mirror 203.

In an embodiment, gravity-enforced photon momentum radiometer 200 includes a pivot member 214 in mechanical communication with the tiltable platform 207 and interposed between the tiltable platform 207 and the reference platform 219, such that tiltable platform 207 pivots about the pivot member 214 at tilt angle β with respect to reference platform 219.

In an embodiment, gravity-enforced photon momentum radiometer 200 includes a height sensor 209 in mechanical communication with the tiltable platform 207 and disposed on an end of the tiltable platform 207 opposing the pivot member 214, such that the height sensor 209 provides a height signal 224 based on the height h of the tiltable platform 207 with respect to the reference platform 219.

In an embodiment, gravity-enforced photon momentum radiometer 200 includes a height adjustment member 208 in mechanical communication with the tiltable platform 207 and disposed on an end of the tiltable platform 207 opposing the pivot member 214, such that the height adjustment member 208 adjusts the height h of the tiltable platform 207 with respect to the reference platform 219.

In an embodiment, gravity-enforced photon momentum radiometer 200 includes a phase sensitive detector 217 in communication with the photogate 206 and that receives the detector signal 221 from the photogate 206, demodulates the detector signal 221 at a modulation frequency $f_m$, and produces a balanced position signal 222 for the diamagnetic shuttle 201 from the detector signal 221.

In an embodiment, gravity-enforced photon momentum radiometer 200 includes an electrical feedback controller 215 in communication with the phase sensitive detector 217 and the height sensor 209 and that receives the balanced position signal 222 from the phase sensitive detector 217, receives a height signal 224 from the height sensor 209, produces a height control signal 223 based on the balanced position signal 222 and the height signal 224, and communicates the height control signal 223 to the height adjustment member 208, such that the height adjustment member 208 adjusts the height h of the tiltable platform 207 with respect to the reference platform 219 under control of the height control signal 223 from the electrical feedback controller 215.

In an embodiment, gravity-enforced photon momentum radiometer 200 includes an air shield 218 in which the magnetic array 202, the diamagnetic shuttle 201, the mirror 203, the tiltable platform 207, the photogate 206, and the photo interrupter 205 are disposed.

Gravity-enforced photon momentum radiometer 200 can be made of various elements and components that can be sourced from commercial sources or custom fabricated or modified to suit particular applications. Optical coatings and materials used for various elements can be selected for operation with laser wavelengths across a broad or narrow spectral range and selected power. Elements of gravity-enforced photon momentum radiometer 200 can be various sizes and selected based on operating parameters such as handling a laser beam of a particular size of power range.

Elements of gravity-enforced photon momentum radiometer 200 can be made of a material that is physically or chemically resilient in an environment in which gravity-enforced photon momentum radiometer 200 is disposed. Exemplary materials include a metal, ceramic, thermoplastic, glass, semiconductor, and the like. Various elements of gravity-enforced photon momentum radiometer 200 can be made of the same or different material and can be monolithic in a single physical body or can be separate members that are physically joined.

Diamagnetic shuttle 201 levitates above the magnetic array 202 due to diamagnetic levitation. The diamagnetic shuttle 201 allows the mirror 203 and photo interrupter 205 to move in the horizontal plane in response to incident optical force 216 and in the direction of the incident optical force 216 of laser light 220. The diamagnetic shuttle 201, mirror 203, and photo interrupter 205 are non-metallic to prevent eddy currents during motion in the magnetic field. Eddy currents would present damping effects. The diamagnetic shuttle 201 can be made of various materials. An exemplary diamagnetic material is pyrolytic graphite. The shape and size of diamagnetic shuttle 201 can be selected with respected to the diamagnetic levitation force 204 that can be exerted upon diamagnetic shuttle 201 from magnetic array 202. Accordingly, diamagnetic shuttle 201 can take a simple cubic or parallelepiped shape having a mass that still allows contactless levitation of diamagnetic shuttle 201 above magnetic array 202.

The magnetic array 202 can include a plurality of magnets that provide a nonuniform magnetic field to levitate the diamagnetic shuttle 201 in a vertical direction relative to the reference platform 219 and to constrain motion of the diamagnetic shuttle 201 in a horizontal plane relative to the reference platform 219. In an embodiment, the magnetic array 202 includes an array of magnets arranged with alternating polarity (e.g., up/down) that produces a nonuniform magnetic field in which the diamagnetic shuttle 201 levitates in the vertical direction and weakly constrains motion of the diamagnetic shuttle 201 in the horizontal plane. The number and arrangement of the individual magnets can be provided so that the magnetic array 202 produces a potential well total magnetic flux density in which diamagnetic shuttle 201 levitates at a prescribed distance above the surface of the magnets in the array. Exemplary magnets include NdFeB permanent magnets. The shape of the array can be, e.g., cubic although other arrangements can be used.

Mirror 203 reflects laser light 220 that provides the incident optical force 216 to the diamagnetic shuttle 201 and is highly reflective at the wavelength of the laser light 220. The laser light 220 reflects from the mirror 203 in an absence significant absorption or transmission of the laser light 220 by the mirror 203 that otherwise would produce heat. The mirror 203 is attached to the diamagnetic shuttle 201 so that the laser force 216 on the mirror is translated to the shuttle. Attachment of the mirror 203 to the diamagnetic shuttle 201 can be done in various ways, including mechanical fasteners, adhesive, and the like.

Diamagnetic levitation force 204 results from the diamagnetic material of the diamagnetic shuttle 201 interacting with the vertically directed magnetic field of the magnetic array 202. The diamagnetic levitation force 204 prevents friction between the diamagnetic shuttle 201 and the magnetic array 202 and provides a nearly-frictionless motion of the diamagnetic shuttle 201 in the horizontal plane without the use of electronics or complex spring geometries.

Photo interrupter 205 is disposed on diamagnetic shuttle 201. The shape of the photo interrupter 205 can be tailored to selectively block the source light. An exemplary shape is a fin shape. As the diamagnetic shuttle 201 moves, photo interrupter 205 moves as well, blocking (also referred to as interrupting) the light beam (e.g., the source light) within the photogate 206 to provide a monotonic transmitted light level as a function of the position of the diamagnetic shuttle 201, as detected by the detector in the photogate 206. It should be appreciated that photo interrupter 205 is optically opaque to the source light of photogate 206

The photogate 206 is in dynamic optical communication with photo interrupter 205 and electrical communication with phase sensitive detector 217. Photogate 206 can include an optical source that produces source light and a detector that produces detector signal 221 as a voltage signal proportional to the detected optical power. As the diamagnetic shuttle 201 moves in response to the incident optical force 216, the photo interrupter 205 blocks more or less of the source light from the light source of photogate 206 that changes the received power at the detector of photogate 206. As a result, the detector produces detector signal 221 as an output voltage, wherein detector signal 221 monotonically indicates the position of the photo interrupter 205 and, accordingly, the position of diamagnetic shuttle 201. The photogate 206 can be obtained from a commercial vendor or custom made. Temperature drift caused by or stray light from the operating environment can change the output voltage of detector signal 221. To minimize these effects, the drive voltage to the optical source can be modulated at a rate within the bandwidth of the detector. In this mode of operation of photogate 206, the detector signal 221 can be read using a phase sensitive detector 217, e.g., a lock-in amplifier that is referenced to modulation frequency $f_m$ of the modulation signal driving the optical source.

Tiltable platform 207 can be a rigid member that supports the magnetic array 202 along its length between pivot end 226 and terminal end 225. The height adjustment member 208 can be disposed at terminal end 225 to tilt the tiltable platform 207 so that tiltable platform 207 pivots about pivot member 214 disposed at pivot end 226 of tiltable platform 207. In this manner, tiltable platform 207 can tilt at tilt angle β with respect to reference platform 219. Tilting tiltable platform 207 provides continuous tuning of the gravitational force in the direction parallel to the tiltable platform 207 through a range of tilt angles β.

Piezoelectric element 208 provides a force to lift the terminal end 225 of the tiltable platform 207 to height h. The greater the tilt angle β of the tiltable platform 207, the greater the gravitational restoring force to oppose the incident optical force 216 from the laser light 220. It should be appreciated that other elements besides a piezoelectric element can be used to provide control of height h in response to a control voltage, e.g., height control signal 223 from electrical feedback controller 215.

Height sensor 209 provides an absolute measurement of height h to which the tiltable platform 207 is lifted at terminal end 225. Various distance measuring techniques or devices can be used manually or automated, including a distance-measuring interferometer, capacitive sensor, Sagnac interferometer with an optical lever configuration, and the like.

Perpendicular length 210 is the distance from the pivot 214 at pivot end 226 to the position of the piezoelectric element 208 at terminal end 225 and with the tilted height h of the tiltable platform 207 determines the tilt angle β of the tiltable platform 207 and the angle of incidence between the mirror 203 normal direction and the laser light 220. This angle is used in determining the incident optical power from the measured force with which it pushes the mirror 203. The perpendicular length 210 is chosen to compliment the piezoelectric transducer 209 and to provide a gravitational feedback force that spans the range of force delivered by the incident optical power. The tilt angle β of the tiltable platform 207 can be measured by a procedure or device, e.g., a machine vision apparatus or software, that does not require knowledge of the perpendicular length 210, wherein perpendicular length 210 can be left undetermined.

Forces subjected to diamagnetic shuttle 201 determine motion of diamagnetic shuttle 201 under incident optical force 216. Normal force 211 is the component of the force of gravity on the diamagnetic shuttle 201, mirror 203, and photo-interrupter 205 which acts in the direction perpendicular to the surface of the tiltable platform 207 that opposes diamagnetic shuttle 201. The diamagnetic levitation effect raises the diamagnetic shuttle 201 via to a height where the diamagnetic levitation force 204 is equal and opposite to the normal force 211.

Parallel gravity force 212 is the component of the force of gravity on the diamagnetic shuttle 201, mirror 203, and photo-interrupter 205 that acts in the direction parallel to the tiltable platform 207 and opposed to the force 216 of the incident optical power.

Full gravity force 213 is the full gravitational force acting on the diamagnetic shuttle 201, mirror 203, and photo-interrupter 205. It should be appreciated that the full gravity force 213 includes normal force 211 and parallel gravity force 212. The parallel gravity force 212 acts to pull the diamagnetic shuttle 201 downhill along the magnet array 202, and the incident optical force 216 due to radiation pressure of laser light 220 pushes the diamagnetic shuttle 201 uphill along the magnetic array 202.

Pivot member 214 is a low-friction pivot by which tiltable platform 207 rotates about a known, fixed spatial reference. A change in the position of this fixed reference during motion of the tiltable platform could introduce an error in estimation of the tilt angle β of the tiltable platform 207 and an error in the estimate of the optical power of laser light 220.

Electrical feedback 215 is provided for automatically adjusting height h of tiltable platform 207 in response to diamagnetic shuttle 201 being subjected to incident optical force 216 from laser light 220 that displaces diamagnetic shuttle 201. Here, the modulated voltage output (detector signal 221) of the photogate 206 is demodulated with phase-sensitive detector 217 and amplified to drive the piezoelectric transducer 208. As a result, feedback loop 215 controls the piezoelectric transducer 218 to increase and decrease the tilt angle of the tiltable platform 207 so as to balance the incident optical force 216 with parallel gravity force 212. Accordingly, the balanced position is determined from the modulated signal from the photogate 206 read with the phase sensitive detector 217.

The laser light 220 reflected from the mirror 203 imparts momentum and force to the mirror 203. The incident optical force 216 is the component of that force in the direction defined by the uphill direction of the plane of the tiltable platform 207.

Because gravity-enforced photon momentum radiometer 200 can be sensitive to very small forces, gravity-enforced photon momentum radiometer 200 can include air shield 218 in which various components (e.g., diamagnetic shuttle 201, mirror 203, photo interrupter 205, magnetic array 202, tiltable platform 207, and the like) are disposed. Air shield 218 can be hermetically sealed to be air-tight and prevent airflow from the external environment from affecting the measured position of diamagnetic shuttle 201. The air shield 218 allowing laser light 220 to be optically communicated into air shield 218 if the source of laser light 220 is not disposed in air shield 218. It is contemplated that air shield 218 can include a window, a fiber-optic pass-through, shutter, and the like to communicate laser light 220 into or out of air shield 218.

Gravity-enforced photon momentum radiometer 200 can be made in various ways. It should be appreciated that gravity-enforced photon momentum radiometer 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, gravity-enforced photon momentum radiometer 200 can be disposed in a terrestrial environment or space environment where there is a gravitational or otherwise force component (e.g. centripetal force) available. Elements of gravity-enforced photon momentum radiometer 200 can be formed from silicon, silicon nitride, and the like although other suitable materials, such ceramic, glass, or metal can be used. According to an embodiment, the elements of gravity-enforced photon momentum radiometer 200 can be made by additive or subtractive manufacturing. Certain components can be obtained from commercial vendors or can be custom made.

Gravity-enforced photon momentum radiometer 200 has numerous advantageous and unexpected benefits and uses. In an embodiment, a process for measuring optical power of laser light 220 with gravity-enforced photon momentum radiometer 200 includes: producing a diamagnetic levitation force 204 by a magnetic array 202 of the gravity-enforced photon momentum radiometer 200, the gravity-enforced photon momentum radiometer 200 comprising: the magnetic array 202; a diamagnetic shuttle 201 disposed proximate to the magnetic array 202 such that the diamagnetic shuttle 201 is in communication with the magnetic array 202; a mirror 203 disposed on the diamagnetic shuttle 201; a tiltable platform 207 on which is disposed the magnetic array 202, such that the magnetic array 202 is interposed between the tiltable platform 207 and the diamagnetic shuttle 201, wherein the tiltable platform 207 positions the magnetic array 202 at a tilt angle β with respect to a reference platform 219, wherein tilt angle β depends on an amount of the incident optical force 216 received by the mirror 203, and tilt angle β changes based on the amount of the incident optical force 216 received by the mirror 203; a photogate 206 comprising an optical source light and a detector; and the photo interrupter 205 disposed on the diamagnetic shuttle 201; subjecting the diamagnetic shuttle 201 to the diamagnetic levitation force 204 from the magnetic array 202; levitating the diamagnetic shuttle 201 above the magnetic array 202 in response to the diamagnetic levitation force 204; receiving the laser light 220 by the mirror 203; moving, the diamagnetic shuttle 201, in response to the mirror 203 receiving the incident optical force 216 of the laser light 220 in a direction of propagation of the laser light 220; positioning, by the tiltable platform 207, the magnetic array 202 at a tilt angle β with respect to the reference platform 219, wherein tilt angle β depends on an amount of the incident optical force 216 received by the mirror 203; changing the tilt angle β based on the amount of the incident optical force 216 received by the mirror 203; producing, by the optical source of the photogate 206, gate light modulated at modulation frequency $f_m$; transmitting, from the optical source of the photo interrupter 205, the gate light; moving the photo interrupter 205 relative to the photogate 206 based on movement of the diamagnetic shuttle 201; blocking, with the photo interrupter 205, some or all of the gate light as a function of the movement of the diamagnetic shuttle 201 caused by receipt of the laser light 220 by the mirror 203; subjecting the gate light to being blocked by the photo interrupter 205, such that the amount of blocking by the photo interrupter 205 depends upon the position of the diamagnetic shuttle 201 relative to the photogate 206 as modified by the amount of the incident optical force 216 received by the mirror 203, detecting, by the detector of the photogate 206, the gate light; and producing, by the detector, a detector signal 221 based on the amount of the gate light detected, such that the detector signal 221 provides the position of the diamagnetic shuttle 201 relative to the tiltable platform 207; and determining, from the detector signal 221, the optical power of the laser light 220.

In an embodiment, the process measuring optical power includes pivoting the tiltable platform 207 about a pivot member 214 of the gravity-enforced photon momentum radiometer 200 at tilt angle β with respect to reference platform 219 in response to receiving the laser light 220 by the mirror 203, the pivot member 214 being in mechanical communication with the tiltable platform 207 and interposed between the tiltable platform 207 and the reference platform 219.

In an embodiment, the process measuring optical power includes providing, by a height sensor 209, a height signal 224 based on the height h of the tiltable platform 207 with respect to the reference platform 219, wherein the gravity-enforced photon momentum radiometer 200 further comprises the height sensor 209 in mechanical communication with the tiltable platform 207 and is disposed on an end of the tiltable platform 207 opposing the pivot member 214.

In an embodiment, the process measuring optical power includes adjusting, by a height adjustment member 208, the height h of the tiltable platform 207 with respect to the reference platform 219, wherein the gravity-enforced photon momentum radiometer 200 further comprises the height adjustment member 208 in mechanical communication with the tiltable platform 207 and is disposed on an end of the tiltable platform 207 opposing the pivot member 214

In an embodiment, the process measuring optical power includes receiving, by a phase sensitive detector 217 in communication with the photogate 206, the detector signal 221 from the photogate 206; demodulating the detector signal 221 at the modulation frequency $f_m$; and producing a balanced position signal 222 for the diamagnetic shuttle 201 from the detector signal 221.

In an embodiment, the process measuring optical power includes receiving, by an electrical feedback controller 215, the balanced position signal 222 from the phase sensitive detector 217; receiving, by the electrical feedback controller 215, a height signal 224 from the height sensor 209; producing, by the electrical feedback controller 215, a height control signal 223 based on the balanced position signal 222 and the height signal 224; communicating the height control signal 223 to the height adjustment member 208 from the electrical feedback controller 215; and adjusting, by the height adjustment member 208, the height h of the tiltable platform 207 with respect to the reference platform 219 under control of the height control signal 223 from the electrical feedback controller 215, wherein the gravity-enforced photon momentum radiometer 200 includes the electrical feedback controller 215 in communication with the phase sensitive detector 217 and the height sensor 209.

In an embodiment, the process measuring optical power includes protecting, with an air shield 218 of the gravity-enforced photon momentum radiometer 200, the position of the diamagnetic shuttle 201 from changes caused by fluctuations due to temperature or air movement, wherein the gravity-enforced photon momentum radiometer 200 further comprises the air shield 218 in which the magnetic array 202, the diamagnetic shuttle 201, the mirror 203, the tiltable platform 207, the photogate 206, and the photo interrupter 205 are disposed.

In an embodiment, the process measuring optical power includes reflecting, by the mirror 203, the laser light 220, such that the mirror 203 is highly reflective at the wavelength of the laser light 220 whereby the laser light 220 reflects from the mirror 203 in an absence significant absorption or transmission of the laser light 220 by the mirror 203 that otherwise would produce heat.

In an embodiment, the process measuring optical power includes determining the optical power of the laser light 220 from the combined mass of the diamagnetic shuttle 201, mirror 203, and photo interrupter 205, the gravitational acceleration of the diamagnetic shuttle 201, and the tilt angle β of the magnetic array 202.

Accordingly, the gravity-enforced photon momentum radiometer 200 measures optical power by equating the force of laser light 220 to a gravitational force. When the laser light 220 is incident on the mirror 203 mounted to the diamagnetic shuttle 201, the diamagnetic shuttle 201 moves in the direction of propagation of laser light 220 due to the momentum of the laser light 220. However, the diamagnetic shuttle 201 is constrained in the vertical direction by gravity and diamagnetic levitation and is constrained in the horizontal plane by the interaction of the diamagnetic shuttle 201 with the magnet array 202. The magnet array 202 can include magnets of alternating polarity (e.g., polarity up and polarity down). The relative dimensions of the diamagnetic shuttle 201 and individual magnets of magnetic array 202 as well as the strengths of the magnets provide a weak potential well that is of sufficient strength to prevent the diamagnetic shuttle 201 from moving out of position and weak enough to respond to the range of force from incident optical force 216.

Advantageously, gravity-enforced photon momentum radiometer 200 overcomes limitations and technical deficiencies of conventional devices and conventional processes and provides a better way to measure laser power using radiation pressure pushing on a mirror supported by a diamagnetic spring, e.g. a pyrolytic graphite levitating in a magnetic field. The gravity-enforced photon momentum radiometer 200 is better than conventional diamagnetic approaches at least because the gravity-enforced photon momentum radiometer 200 includes a closed-loop operation that obviates characterization of specific parameters of the diamagnetic response of the pyrolytic graphite. Moreover, the gravity-enforced photon momentum radiometer 200 can be simpler to implement than certain conventional technology because it does not involve characterization of the diamagnetic strength of the pyrolytic graphite or the strength of magnetic field. The force that is characterized is the combined weight of the levitating diamagnetic shuttle 201, mirror 203, and photo interrupter 205, which is contemplated to be known better than the requisite uncertainty. The gravity-enforced photon momentum radiometer 200 can be cheaper than conventional primary standard optical power meters.

Gravity-enforced photon momentum radiometer 200 uses gravity as a feedback force to control the position of the diamagnetic shuttle 201 that magnetically levitates above magnetic array 202. It should be appreciated that acceleration due to gravity is a well-known quantity, and by tilting magnetic array 202, one can precisely and accurately control and quantify the amount of parallel gravity force 212 experienced by the diamagnetic shuttle 201. The tilt angle $\beta$ can be the proportionality constant that determines how much parallel gravity force 212 pushes on the diamagnetic shuttle 201, and tilt angle $\beta$ can be measured interferometrically. The gravity-enforced photon momentum radiometer 200 includes a low-noise feedback signal produced by phase sensitive detector 217 with a modulated drive voltage with its output read with coherent detection.

The gravity-enforced photon momentum radiometer 200 measures laser power in a small spatial footprint. It also is a power meter that is low-cost and can be a primary standard that is directly traceable to the international System of Units (SI).

The articles and processes herein are illustrated further by the following Example, which is non-limiting.

EXAMPLE

An absolute detector described here measures laser power by means of radiation pressure in a closed control-loop configuration using diamagnetically levitated graphite as the soft spring and gravity as a contactless restoring force. An extremely low spring stiffness (2.9 mN/m) is afforded by diamagnetic levitation above a permanent magnet array, and a lock-in amplifier in the feedback loop attains a noise equivalent power of 30 mW/$\sqrt{Hz}$. A horizontally directed laser beam impinges on a highly reflective dielectric stack mirror mounted on the levitating pyrolytic graphite shuttle. The light's momentum displaces the shuttle and its position is restored by tilting the magnet array with a piezoelectric actuator. The closed-loop configuration avoids the need for accurate knowledge of the system spring constant or environmental dependencies of the diamagnetic levitation. Absolute laser power measured is traceable to the mass of the diamagnetically levitating shuttle system, the local gravitational acceleration, and the interferometrically-measured tilt angle of the magnet array. The system is described with a laser power of 2.7 W yielding an expanded uncertainty (k=2) of 1.8%. The upper limit of measurable power is determined by the range of the piezoelectric actuator and the minimum power is currently limited by the noise floor that is constrained by environmental noise.

Figure 2:
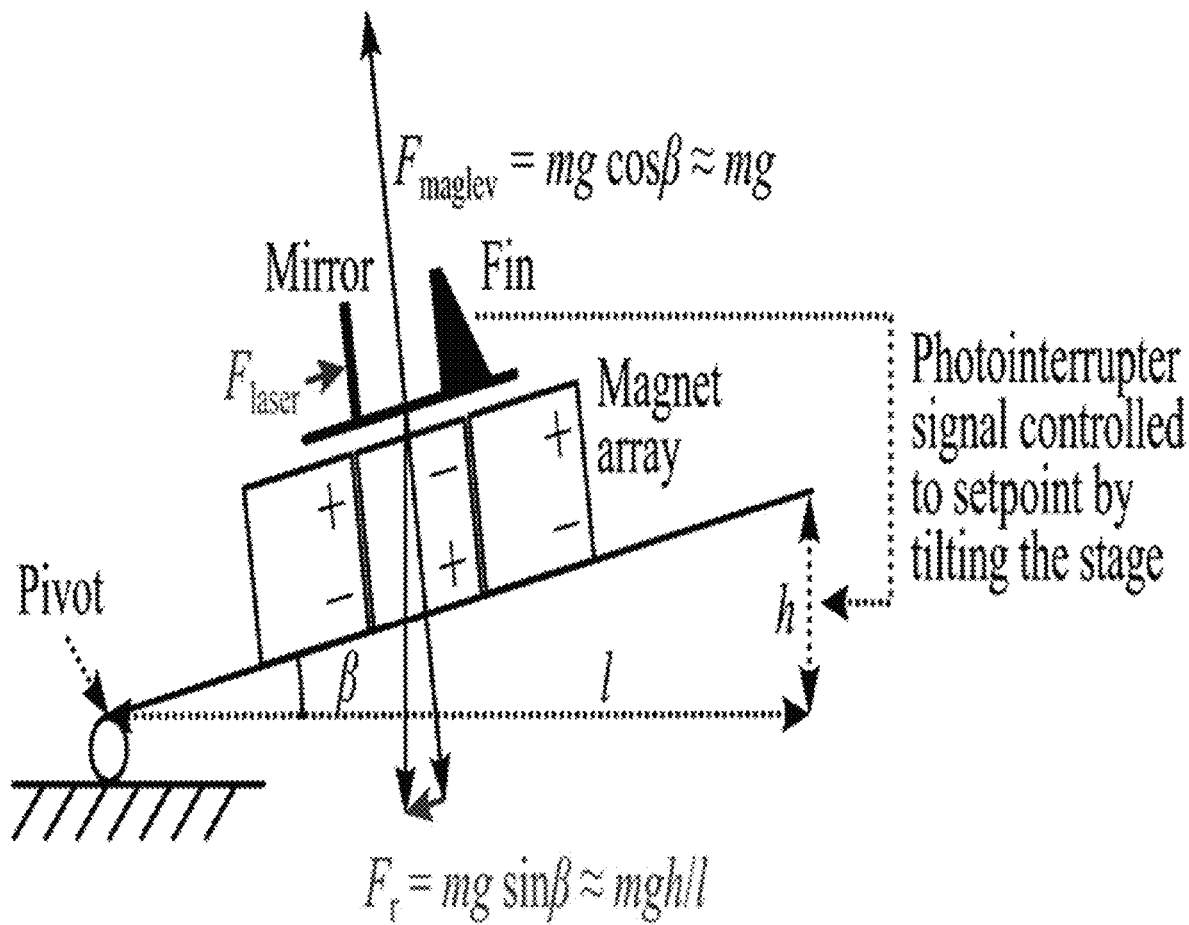
FIG. 2 shows a gravity-enforced photon momentum radiometer (also referred to as an absolute radiation pressure detector) including diamagnetic levitation, wherein the detector can be operated in closed loop so that the levitating system's position is kept constant. Small angle approximations $h/l=\tan\beta=\beta$ and $\sin\beta\approx\beta$ are used for determining the gravitational restoring force $F_r$, according to some embodiments.

A gravity-enforced photon momentum radiometer, also referred to herein as an absolute magnetic levitation radiation pressure detector or maglev detector, operates closed loop and at room temperature. The maglev detector measures radiation pressure from the horizontal force perpendicular to a mirror mounted to a pyrolytic graphite shuttle, diamagnetically levitating on top of an array of permanent magnets as shown in FIG. 1 and FIG. 2. A photo-interrupter includes a light-emitting diode (LED) and a phototransistor. A highly reflective dielectric mirror and an opaque fin for partially blocking the photo interrupter signal are mounted on the long ends of the shuttle. When laser force $F_{laser}$ hits the mirror displacing the shuttle, the photo interrupter's voltage changes.

At the levitation height, the gravitational force equals to the diamagnetic force:

$$mg = \frac{|\chi_z| V B_z \nabla B_z}{\mu_0}, \quad (1)$$

where m is the mass of the levitating system, g is the local gravitational acceleration, $\chi_z = -4.5 \cdot 10^{-4}$ is the magnetic susceptibility of pyrolytic graphite along z-axis (axis perpendicular to the magnet array), V is the volume of the pyrolytic graphite, $\mu_0 = 4 \cdot 10^{-7}$ H/m is the vacuum permeability, and $B_z$ and $\nabla B_z$ are the magnetic flux density and its gradient along z-axis.

The maglev detector is operated in closed loop according to FIG. 1 and FIG. 2. When the laser beam hits the mirror, the position of the pyrolytic graphite shuttle is maintained with a gravitational restoring force $F_r$. The forces are balanced when $$mg \sin\beta = \frac{P_{opt}}{c} [2\rho(\lambda, \theta) + \alpha(\lambda, \theta) \cdot (1-\rho(\lambda, \theta))] \cos\theta \cos^2(\Phi/2) \cos\beta \quad (2)$$

where $P_{opt}$ is the laser power, c is the speed of light in air, cos $\theta$ is reduction of the force due to the incident beam angle $\theta$, $\cos^2(\Phi/2)$ accounts for the effect of focusing lens where $\Phi$ is the full cone angle of the focused laser beam, and $\beta$ is the angle of the tilt stage determined by measuring the vertical displacement h of the tilt stage using a two-frequency interferometer and by measuring the length of the lever arm from the pivot to the interferometer's measurement point. The mirror's reflectance $\rho(\lambda, \theta)$ and absorption $\alpha(\lambda, \theta)$ depend on the wavelength and the incident angle $\theta$ of the laser. The noise equivalent power of the maglev detector is 30 mW/$\sqrt{Hz}$. In its present configuration it measures laser powers up to 6 W, limited by the travel of the piezoelectric actuator.

The design of this system relaxes force measurement accuracy. The sensitivity of radiation-pressure based optical power meters depends in part on the softness of the spring suspending the mirror. A soft spring is usually achieved with delicate mechanical flexures or active control. Diamagnetic levitation provides a soft spring constant for horizontal translation (2.9 mN/m in our case) achieved without mechanical contact or electronic control. Closed-loop operation eliminates the need to quantify the spring constant or its dependencies. That puts the burden of accuracy on the restoring force. Typically, closed-loop radiation pressure power meters deliver the restoring force electrostatically. Their force calibration requires either highly characterized geometries and current measurements or external force calibration using transfer-standard calibrated masses. But calibrated masses even for relatively high continuous-wave powers involve calibration masses so small as to be prohibitively difficult to handle. For example, 100 W of optical power yields a radiation pressure force of only 670 nN (68 microgram equivalent mass). Our gravity-assisted diamagnetic levitation design still requires an accurate mass measurement but only of the 222 mg mass of the shuttle and mirror. The accurate measurement of the radiation pressure forces is performed simply by an interferometric distance measurement.

The performance of the maglev detector was compared against a radiation thermopile traceable to the C-series calorimeter at the National Institute of Standards and Technology (NIST). Here, the maglev detector's response was compared against a radiation thermopile detector traceable to NIST's C-series calorimeter at the laser wavelength of 1070 nm. The measurement setup was arranged so that the laser beam reflected from the maglev detector's highly reflective mirror was measured with the thermopile detector.

Figure 4:
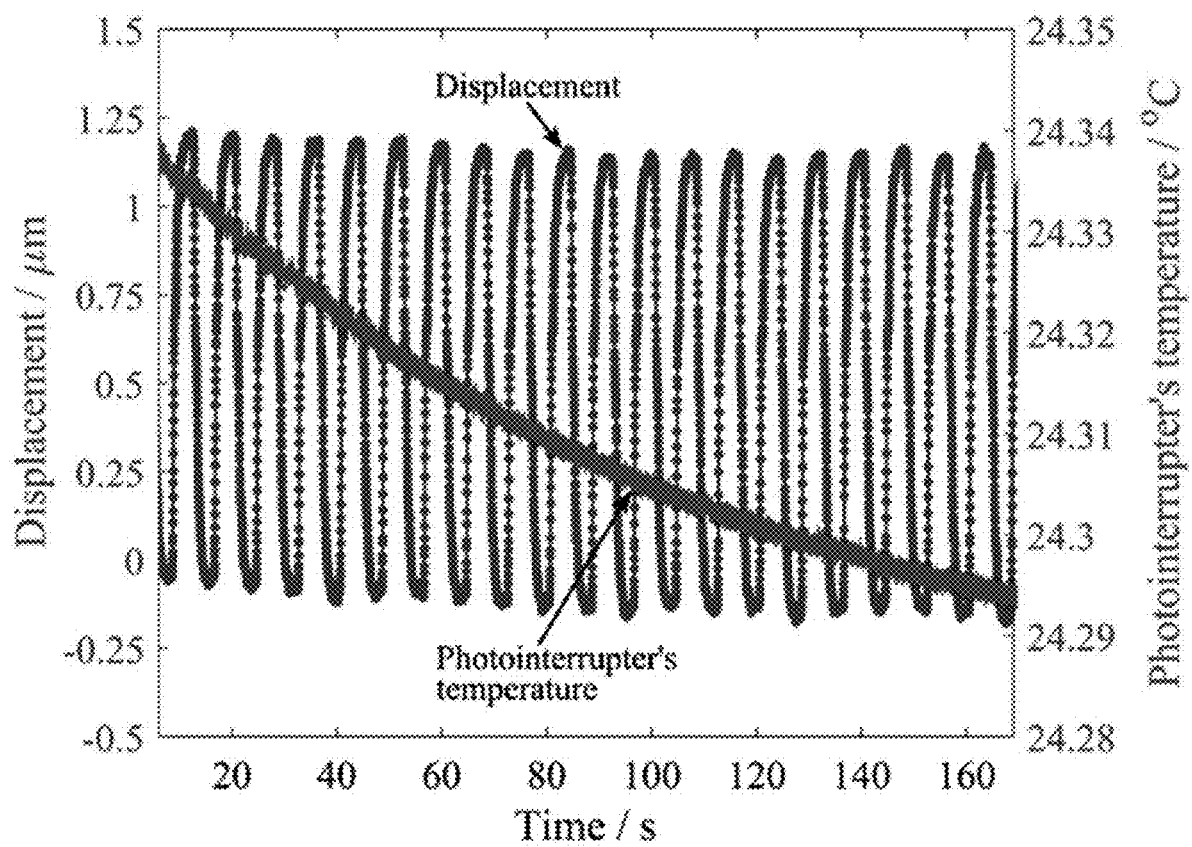
FIG. 4 shows displacement h to laser power with 8 s measurement cycles (laser on for 4 s, off for 4 s), according to some embodiments.
Figure 5:
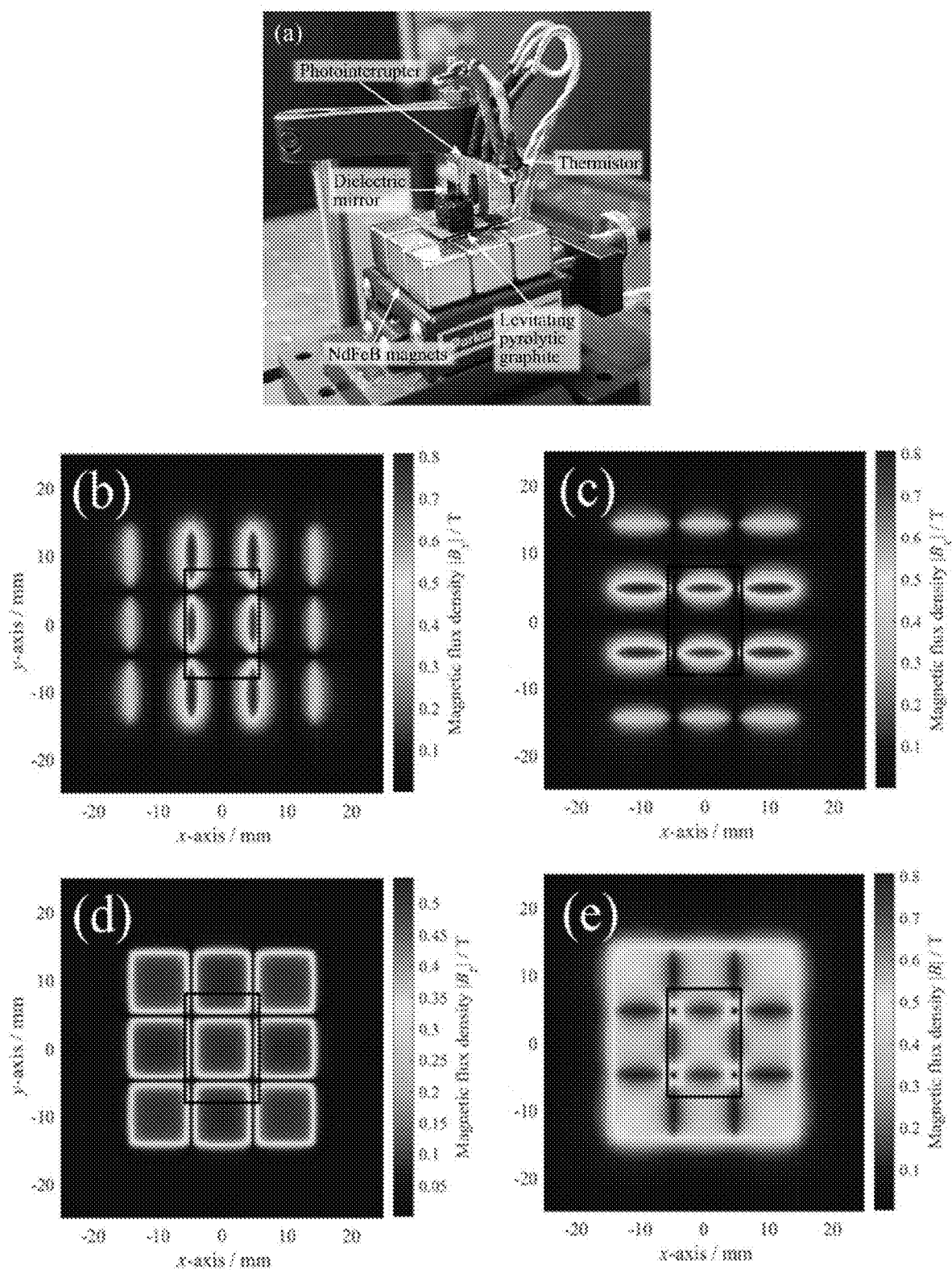
FIG. 5 shows, according to some embodiments, a pyrolytic graphite shuttle levitating on a NdFeB permanent magnet array (a), the absolute magnetic flux density along x-axis $|B_x|$ (b), y-axis $|B_y|$ (c), z-axis $|B_z|$ (d), and total flux density $|B|$ (e) generated by the magnet array at the levitation height of 0.65 mm. Rectangle in (b-e) depicts the size of the levitating shuttle.

The thermopile detector's response is relatively slow and dependent on the selected time interval of the calibration. To obtain correct power, the thermopile must be operated using similar timing as used in the calibration. We measured laser power with the thermopile detector before and after the faster pulse measurements with the maglev detector. Twenty measurement cycles (laser on for 4 s, laser off for 4 s) were measured with the maglev detector according to FIG. 4.

Figure 3:
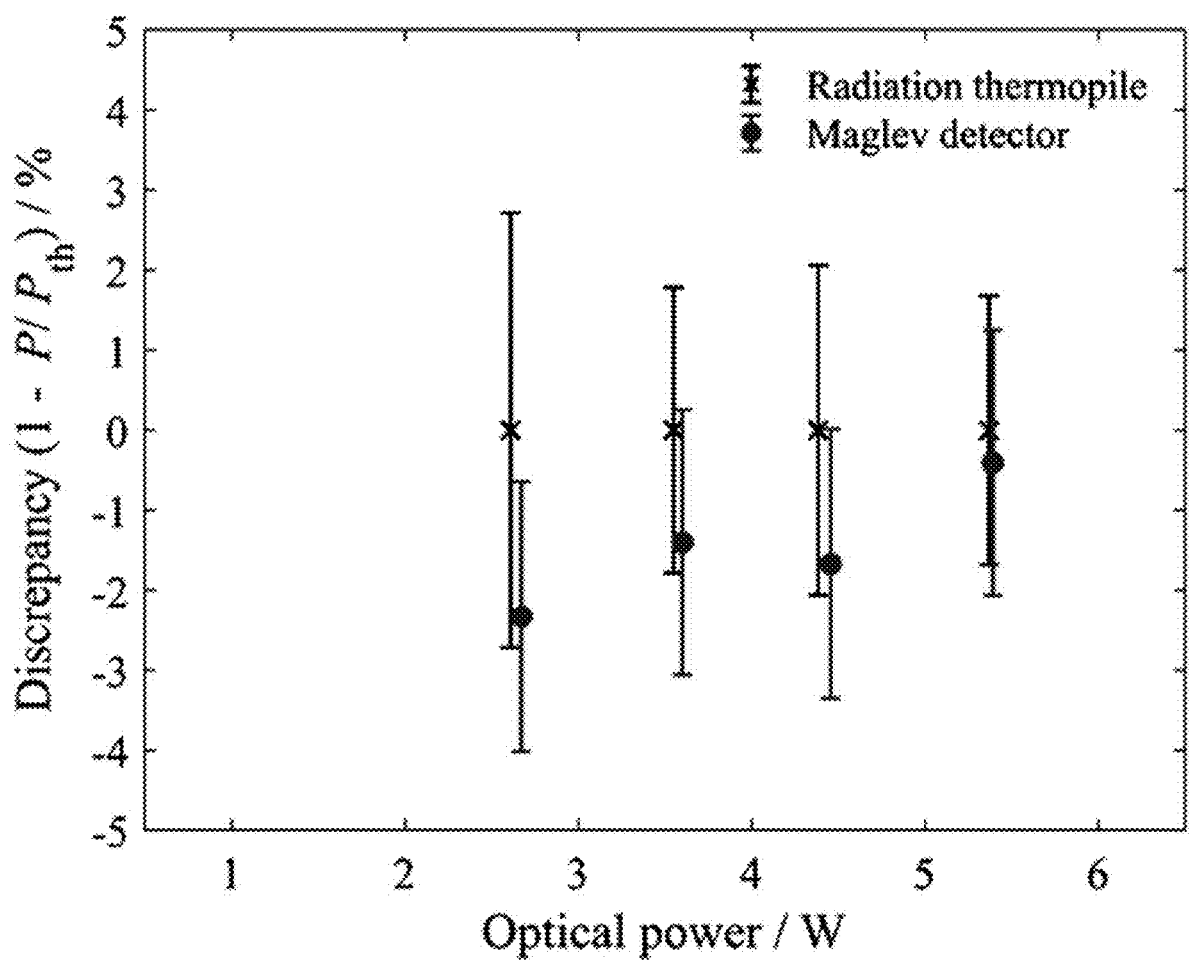
FIG. 3 shows discrepancies of laser power measured using the radiation thermopile traceable to NIST's C-calorimeter and the maglev detector. Uncertainty bars depict an expanded measurement uncertainty (k=2), according to some embodiments.

The comparison results presented in FIG. 3 show that the maglev detector's laser power scale agrees with that of the thermopile detector. The maglev detector's expanded uncertainty (k=2) is 1.8% (FIG. 3) and the radiation thermopile has an expanded uncertainty (k=2) of 2.5% (FIG. 3). The laser power was not measured concurrently because of the different time constants of the detectors, and therefore the laser power fluctuations could not be compensated efficiently in this comparison. The average discrepancy was −1.5% between the two detectors in the comparison.

TABLE 1

| Uncertainty component | ±δ/% | Distribution | Type | u/% |
| --- | --- | --- | --- | --- |
| Mirror reflectance | 0.01 | Rectangular | B | 0.006 |
| Window transmittance | 0.1 | Rectangular | B | 0.06 |
| Mass of the levitating shuttle | 0.23 | Rectangular | B | 0.13 |
| Length of the lever arm | 1.29 | Rectangular | B | 0.75 |
| Heating of the system | 0.5 | Rectangular | B | 0.29 |
| Repeatability (N = 20) | 1.57 | Normal | A | 0.35 |
| Combined standard uncertainty/% | | | | 0.88 |
| Expanded uncertainty/% | | | | 1.8 |

TABLE 2

| Uncertainty component | ±δ/% | Distribution | Type | u/% |
| --- | --- | --- | --- | --- |
| Calibrated responsivity | 0.84 | Normal | B | 0.42 |
| Spatial nonuniformity | 1.0 | Rectangular | B | 0.58 |
| Window transmittance (incoming beam) | 0.1 | Rectangular | B | 0.06 |
| Reflectance of maglev mirror | 0.01 | Rectangular | B | 0.006 |
| Window transmittance (exiting beam) | 0.1 | Rectangular | B | 0.06 |
| Repeatability (N = 2) | 1.3 | Normal | A | 0.92 |
| Combined standard uncertainty/% | | | | 1.24 |
| Expanded uncertainty/% | | | | 2.5 |

Since air currents are reduced by operating the maglev detector in a shielded box with an anti-reflection coated window, absolute laser power $P_{th}$ is obtained from the thermopile detector's response $s_{th}(\lambda)$ as $$P_{th} = \frac{s_{th}(\lambda)}{r_{th}(\lambda)T^2(\lambda,\theta)\rho(\lambda,\theta)}, \quad (3)$$

where $r_{th}(\lambda)=1.571$ mV/W is the responsivity of the thermopile averaged from 40 s to 200 s from the start of laser power pulse at the laser wavelength $\lambda=1070$ nm, T($\lambda$, $\theta$)=0.9988±0.001 is the window transmittance and $\rho(\lambda,\theta)$=0.9976±0.0001 is the reflectance of the maglev's mirror when the laser beam is aligned $\theta=2.4°\pm1°$ from the surface normal of the mirror.

Commercially available radiometers operating near 1 W are mostly radiation thermopile detectors that are not absolute so their traceability is obtained by a calibration to a better laser power meter. The absolute radiation pressure detector herein involves diamagnetic levitation to overcome this issue. Initial measurement results indicate that this radiation pressure detector can fill the gap between conventional high-accuracy absolute thermal detectors operating under 1 W and the absolute radiation pressure detectors operating from a few hundreds of watts to several kilowatts.

The maglev detector can measure laser powers with the lower end being limited by the noise equivalent power of 30 mW/$\sqrt{Hz}$ and upper end being limited by the travel of the piezoelectric actuator (2.8 µm, corresponding to 6 W).

Absolute optical powers measured in this work are traceable to the local gravitational acceleration, the levitating shuttle's mass, and the tilt angle of the system. At laser power of 2.7 W maglev detector achieves an expanded uncertainty (k=2) of 1.8%.

Laser heating in the maglev detector's response was minimized by 8 s measurement cycles so that the laser was on for 4 s and off for 4 s before the next laser pulse. In the future, the heating effects can be reduced by replacing the dielectric mirror with a dielectric mirror optimized for small angles closer to the normal incidence and adding radiation shields to eliminate retro-reflections within the housing. Less heating would permit longer measurement cycles with longer averaging times per pulse and improve the maglev detector's measurement repeatability.

In comparison measurements, the laser power fluctuations and difference in the measuring times of the maglev detector and the radiation thermopile increased the measurement uncertainty. This can be overcome by using a more stable laser in comparisons. With the current configuration, an uncertainty in the lever arm length is the main source of systematic offset. Maglev's measurement uncertainty can be drastically improved by modifying the mechanism and more accurate measurements of the lever arm length. The Maglev's experimental hardware consists largely of off-the-shelf components and could be improved with bespoke mechanical design. For example, the rounded pivot could be replaced with a knife-edge pivot.

The dynamic range of the maglev detector could be extended by replacing the piezoelectric actuator with a piezoelectric stack. Remaining air currents are currently the limiting factor regarding the noise floor 30 mW/√Hz of the maglev detector. Lower noise floor can be achieved by better sealing of the box or by operating the maglev detector in a partial vacuum.

Since the maglev detector has a fast settling time of 2 seconds, and in principle it can be built from inexpensive parts, it might be useful to consider how to further reduce the cost. The expensive FPGA (Field Programmable Gate Array) board that provides a digital lock-in amplifier and proportional-integral controller for the piezoelectric actuator could be replaced with inexpensive analog electronics. In addition, interferometric measurement of the tilt angle could be replaced with an electrical measurement, for example, based on change in capacitance.

The absolute radiation pressure detector based on diamagnetic levitation has a factor of 5 lower uncertainty compared to conventional maglev detectors and rivals the uncertainty of any laser power measurement method near 1 W in air and at room temperature.

In the maglev detector, a diamagnetic pyrolytic graphite shuttle levitates on top of a 3×3 array of 9.53 mm cubic NdFeB permanent magnets as demonstrated in FIG. 5(a). The shuttle is rectangular, with the width of 11.5 mm, length of 16 mm, and thickness of 300 μm, so that it is slightly wider than the width of an individual magnet. With such a geometry, potential minima in the total magnetic flux density, illustrated in FIG. 5(e) modeled using algorithms, horizontally constrains and vertically levitates the shuttle with respect to the top of the magnet array according to Eq. (20). With the shuttle's mass of m=222 mg±0.5 mg and the local gravitational acceleration (Boulder, CO) of g=9.79612 m/s²±0.00005 m/s², the vertical spring stiffness $k_z \approx 4.47$ N/m and the shuttle levitates approximately 0.65 mm above the magnet array.

A highly reflective dielectric mirror and an opaque fin for partially blocking the photo interrupter signal are mounted on the long ends of the shuttle. The mirror is connected to a porous foam that was glued on the shuttle to minimize heat transfer from the mirror. When radiation pressure displaces the shuttle, the photo interrupter's voltage changes. The amount of metal in the levitating shuttle was minimized to avoid eddy current generation that may resist the shuttle's movement, causing unpredictable displacements.

Figure 6:
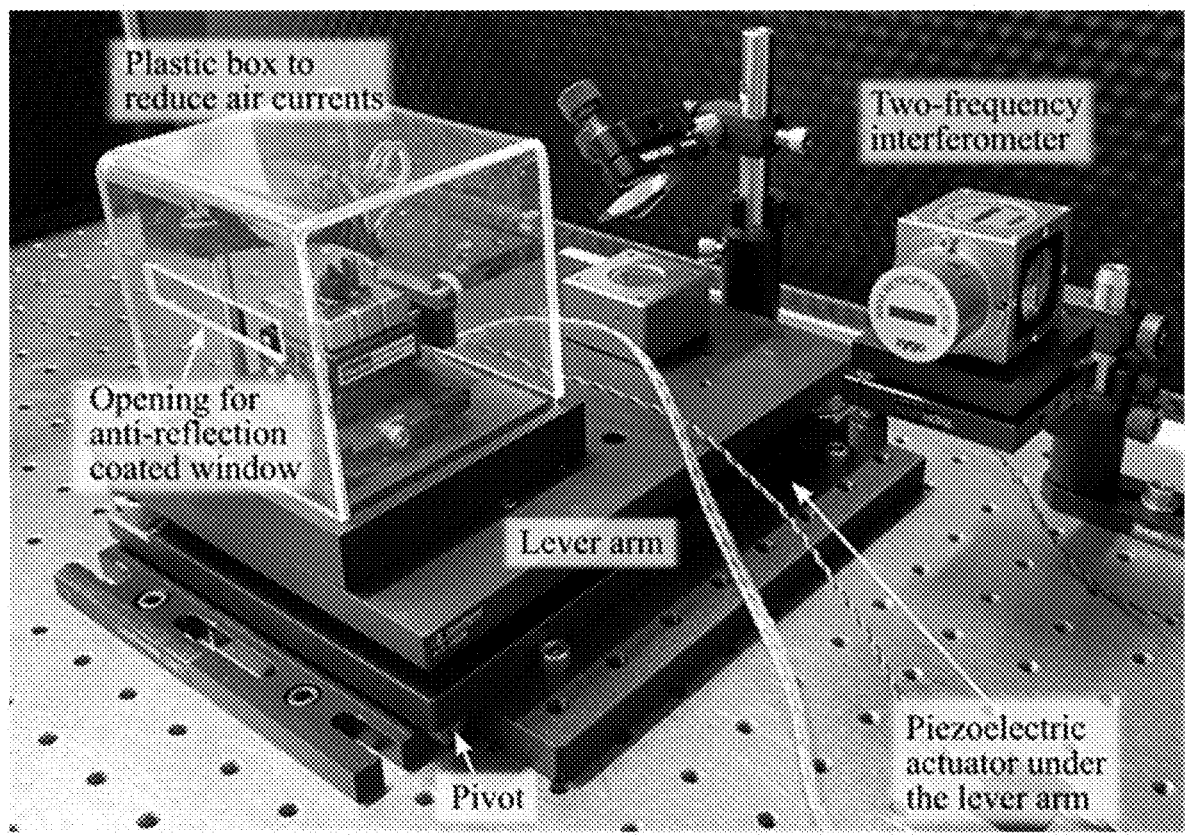
FIG. 6 shows a maglev radiation pressure detector, according to some embodiments.

A photograph of the maglev detector is presented in FIG. 6. The magnet array system is mounted on top of a tilt stage. The tilt stage is motorized by a piezoelectric actuator using a 16-bit control voltage and a high-voltage amplifier with gain of 10 and output range of 0 V-100 V. The tilt angle β is determined by measuring the vertical displacement h of the tilt stage using a two-frequency interferometer and by measuring the length of the lever arm l=155 mm±2 mm from the pivot to the interferometer's measurement point as shown in FIG. 2. The interferometer used had a resolution of 2.5 nm and the sampling frequency of 100 Hz. Since the spring constant of the levitating shuttle is soft, air currents are the dominant noise source that cause low frequency movements which may not be effectively filtered out from the photo interrupter signal. The system was disposed in an air-tight transparent plastic box as an air shield that improves the signal-to-noise ratio of the detector. The laser beam is transmitted inside the box via an anti-reflection coated window with transmittance T(1070 nm, 2.4°) =0.9988±0.001. The laser power expected at the maglev detector must be corrected for this window transmittance. The anti-reflection coating of the window is important because it is not only making the correction factors smaller, but it also minimizes heating of the maglev system due to absorbed reflections from the window back onto the maglev setup.

Due to the geometry of the maglev detector, it may not have an ideal cosine response. The levitating shuttle has a soft spring constant in both directions along the xy-plane (see FIG. 5(b—c)) whereas some conventional radiation pressure detectors have a soft spring constant along one axis. If the shuttle has sideways movement in addition to longitudinal displacement and the system is driven in closed loop, the fin's position with respect to the LED and the phototransistor may change, and the phototransistor sees different signal due to different scatter distribution. To minimize the effect, we align the laser to θ=2.4°±1° angle of incidence with respect to the surface normal of the mirror. With this angle the cosine correction term in Eq. (20) becomes cos θ≈1 and the associated uncertainty is negligible. The term $\cos^2(\Phi/2) \approx 1$ with a focus angle Φ=1.878°. The mirror's reflectance ρ=0.9976±0.0001 at 1070 nm and at an incident beam angle of 2.4° and its backside is opaque, so that the remainder of the laser power that is not reflected will be absorbed (α(λ, θ)≈1). The tilt angle is small, so we use small angle approximations: h/l=tan β≈β, sin β≈β and cos β≈1. With these approximations, absolute laser power is $$P_{opt} = \frac{mgch}{[1 + \rho(\lambda, \theta)]l \, T(\lambda, \theta)}. \quad (4)$$

Feedback for the Control System

The position of the shuttle is measured by a photo interrupter that consists of an infrared light-emitting diode and a phototransistor with a daylight blocking filter. Photo interrupter is driven by 300 Hz reference square wave using a lock-in amplifier technique to remove dark signal of the phototransistor that has a strong temperature dependence and to reduce measurement noise. Removing the dark signal significantly reduces drifting of the response, which is critical for maintaining the dynamic range of the system and staying at the controllable range of the piezoelectric actuator that has a travel of 2.8 μm.

Figure 8:
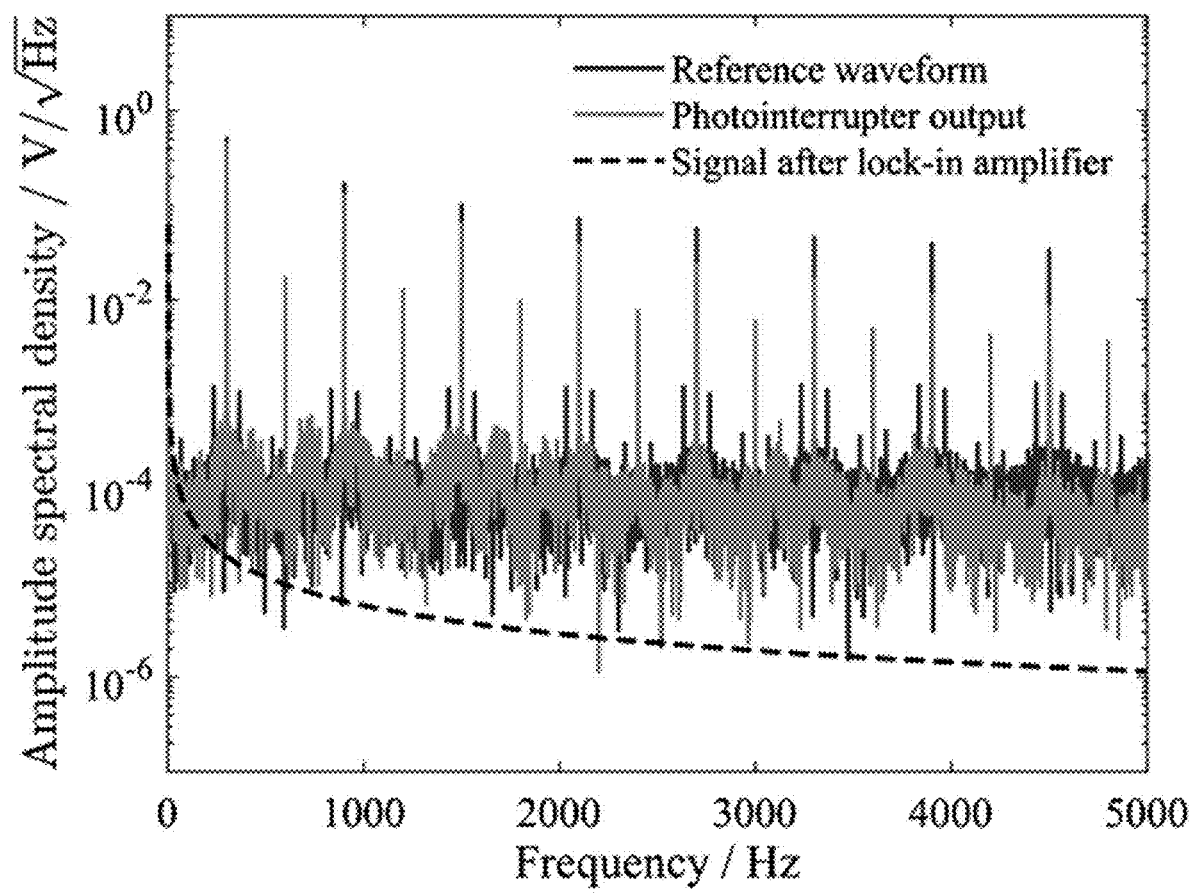
FIG. 8 shows amplitude spectral density of the unfiltered reference square waveform (blue), the unfiltered photo interrupter output (purple), and the photo interrupter output (DC) after the bandpass filter and lock-in amplifier (black dashed curve), according to some embodiments.

The lock-in amplifier was implemented using FPGA board with the sampling frequency of 66.7 kHz. The recorded photo interrupter voltage is first filtered using a 250 Hz-350 Hz $4^{th}$ order band-pass filter. The reference square wave waveform is filtered using the same band-pass filter. Then, the filtered photo interrupter signal is multiplied by the filtered reference waveform and the result is brought to DC by 3 Hz $4^{th}$ order low-pass filter. Cut-off frequency of 3 Hz is selected to allow speed control so that short laser pulse lengths of 4 s can be measured. The 256 cycles are then averaged to obtain the final DC signal used for controlling the system, so the frequency of the control loop is 260 Hz. FIG. 8 shows the amplitude spectral density of the photo interrupter feedback signal after the lock-in amplifier (black dashed curve).

Spring Constant

Figure 7:
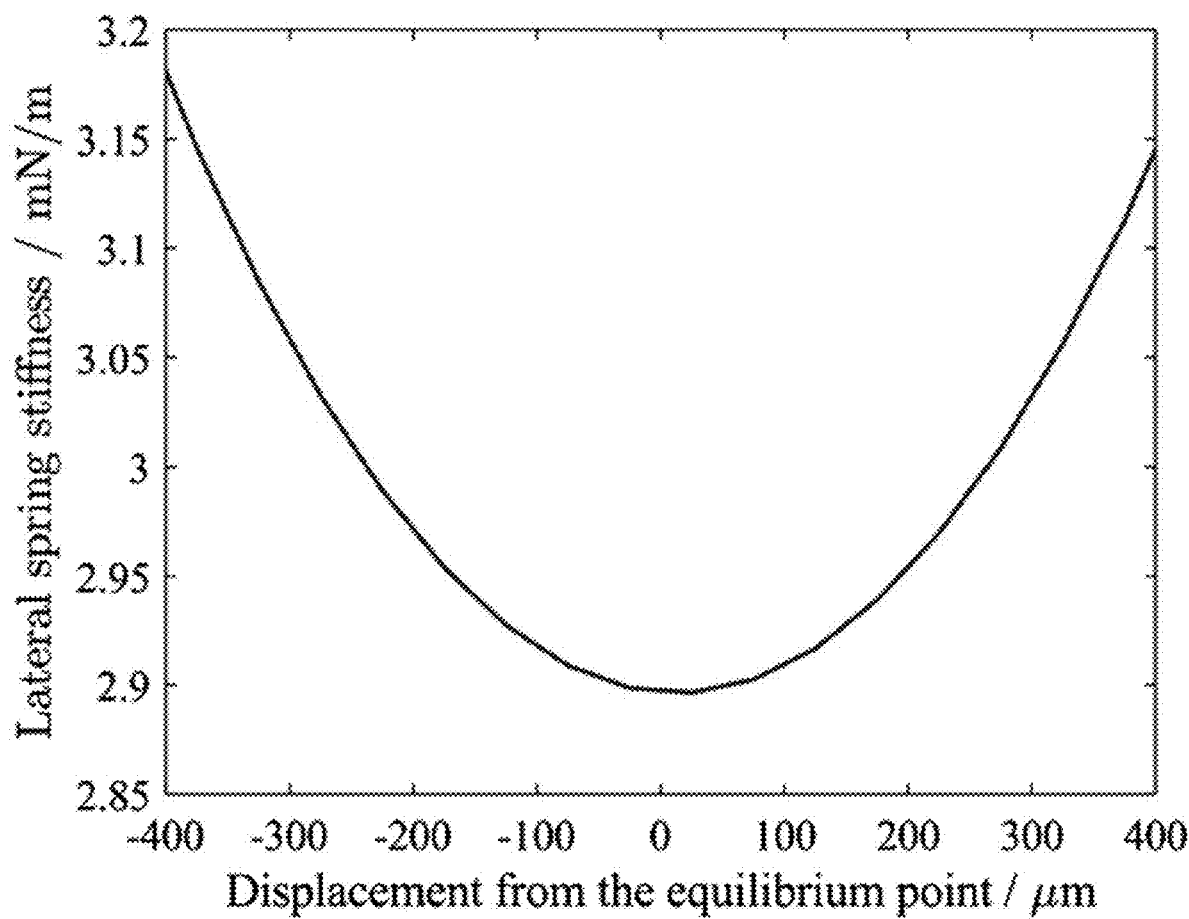
FIG. 7 shows spring stiffness of maglev system along y-axis, according to some embodiments.

Although a spring stiffness does not require calibration, it can be used for estimating the sensitivity of the maglev detector. A lateral spring stiffness $k_y$ of the maglev system along y-axis, plotted in FIG. 7, can be estimated as $$k_y = \frac{dF}{dy} = \frac{d}{dy}\left(\frac{|\chi_y| V B_y \nabla B_y}{\mu_0}\right), \quad (5)$$

from the modeled magnetic flux density $B_y$ at the levitation height in FIG. 5(c) and its gradient $\nabla B_y$, the displacement dy, and the magnetic susceptibility of pyrolytic graphite along y-axis $x_y = -8.5 \cdot 10^{-5}$. At the equilibrium point the lateral spring stiffness $k_y = 2.9$ mN/m, meaning that in open-loop configuration, we would expect that 1 W laser power would displace the levitating shuttle by 2.3 µm.

Heating Effects

Figure 9:
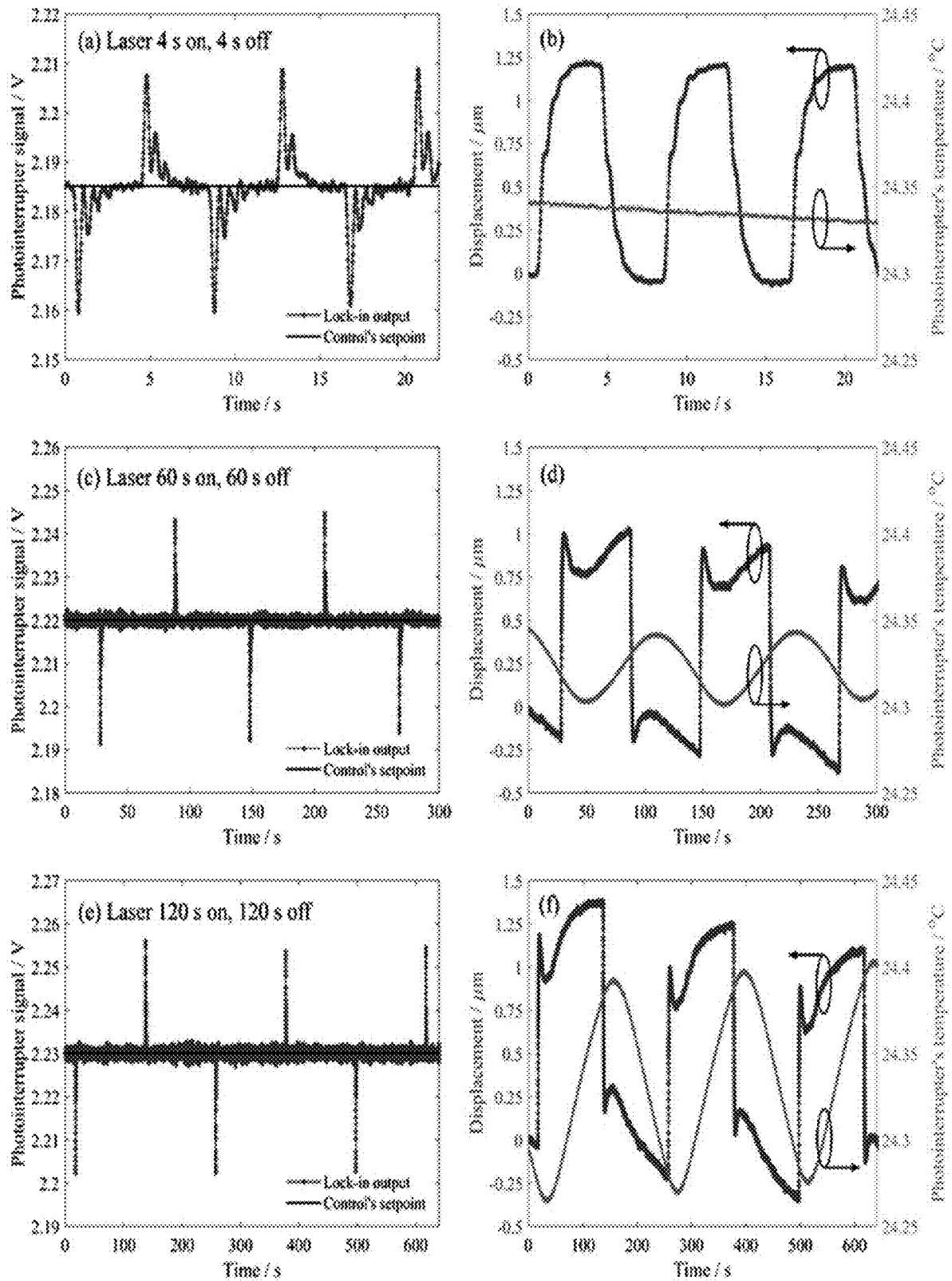
FIG. 9 shows lock-in output and displacement h to laser power with pulse lengths of 4 s (a—b), 60 s (c—d), and 120 s (e—f). Temperature dependent drift due to laser heating is evident with long laser pulses in (d) and (f), according to some embodiments.

The system was disposed in a transparent plastic box as an air-shield which drastically improved the signal-to-noise ratio of the detector. With the air-shield, maglev detector's noise equivalent power was measured to be 30 mW/√Hz. The box has an opening for an anti-reflection coated window and the incident laser beam is aligned at an angle of 2.4° with respect to the window's surface normal. As the laser beam leaves the air-tight chamber, some back-reflected light from the window of the laser beam is incident on the photo interrupter and heats it. We monitor the photo interrupter's temperature with an integrated thermistor during the laser power measurements. FIG. 9 demonstrates how maglev's response is affected by photo interrupter's temperature. With long laser pulses of several tens of seconds, the maglev detector's baseline drifts with changing photo interrupter's temperature. To avoid laser heating, we use 8 s measurement cycles where the laser pulse on for 4 s and off for 4 s.

Since the pyrolytic graphite shuttle is electrically conductive and it experiences a force opposing the movement, it is possible that eddy currents are generated that heat the shuttle. This might create temperature gradients across the pyrolytic graphite shuttle and drifting of the response. However, this effect is small compared to the drift caused by laser heating that is demonstrated in FIG. 9.

Handling of Pyrolytic Graphite

Some solvents, e.g., ethyl alcohol, affect the diamagnetism of pyrolytic graphite. The mirror was mounted vertically to a slot in a polymer foam, so that the mirror can be removed from the shuttle for cleaning to avoid contact of the pyrolytic graphite with solvents.

The following are incorporated by reference herein in their entirety.

P. Pinot and Z. Silvestri "New laser power sensor using diamagnetic levitation," Review of Scientific Instruments 88, 085003-1-8 (2017).

R. J. Diefendorf, "Deposition method of forming a pyrolytic graphite article," U.S. Pat. No. 3,138,434 (June 1964).

J. J. Croat, J. F. Herbst, R. W. Lee, and F. E. Pinkerton, "Pr—Fe and Nd—Fe-based materials: A new class of high-performance permanent magnets (invited)," Journal of Applied Physics 55, 2078-2082 (1984).

M. Sagawa, S. Fujimura, N. Togawa, H. Yamamoto, and Y. Matsuura, "New material for permanent magnets on a base of Nd and Fe (invited)," Journal of Applied Physics 55, 2083-2087 (1984).

M. Kobayashi and J. Abe, "Optical Motion Control of Maglev Graphite," Journal of the American Chemical Society 134, 20593-20596 (2012).

P. Pinot and Z. Silvestri, "Optical power meter using radiation pressure measurement," Measurement 131, 109-119 (2019).

A. B. Artusio-Glimpse, I. Ryger, N. A. Azarova, P. A. Williams, J. A. Nadler, and J. H. Lehman, "Miniature force sensor for absolute laser power measurements via radiation pressure at hundreds of watts," Optics Express 28, 13310, 1-13 (2020).

K. Agatsuma, D. Friedrich, S. Ballmer, G. DeSalvo, S. Sakata, E. Nishida, and S. Kawamura, "Precise measurement of laser power using an optomechanical system," Optics Express 22, 2014-2031 (2014).

G. A. Shaw, J. Stirling, J. A. Kramar, A. Moses, P. Abbott, R. Steiner, A. Koffman, J. R. Pratt, and Z. J. Kubarych, "Milligram mass metrology using an electrostatic force balance," Metrologia 53, A86—A94 (2016).

K. A. Rogers, P. A. Williams, G. A. Shaw, and J. H. Lehman, "Simplified kilogram traceability for high-power laser measurement using photon momentum radiometers," Applied Optics 59, 8719-8723 (2020).

E. D. West and W. E. Case, "Current Status of NBS Low-Power Laser Energy Measurement," IEEE Transactions on Instrumentation and Measurement 23, 422-425 (1974).

J. M. Camacho and V. Sosa, "Alternative method to calculate the magnetic field of permanent magnets with azimuthal symmetry," Revista Mexicana de Física E 59, 8-17 (2013).

D. Cebron, "Magnetic fields of solenoids and magnets," MathWorks File Exchange version 1.0.2. Accessed 03.29.2021: https://www.mathworks.com/matlabcentral/fileexchange/71881-magnetic-fields-of-solenoids-and-magnets Surface Gravity Prediction Online Calculator by NOAA. Accessed 05.03.2021: https://www.ngs.noaa.gov/cgi-bin/grav_pdx.prl M. Partanen, H. Lee, and K. Oh, "Radiation pressure measurement using a macroscopic oscillator in an ambient environment," Scientific Reports 10, 20419 1-8 (2020).

Vishay Semiconductors, "TCST1103, TCST1202, TCST1300—Transmissive Optical Sensor with Phototransistor Output," Datasheet Rev. 2.0 (2011).

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A gravity-enforced photon momentum radiometer for measuring optical power of laser light, the gravity-enforced photon momentum radiometer comprising:
    a magnetic array that produces a diamagnetic levitation force;
    a diamagnetic shuttle disposed proximate to the magnetic array such that the diamagnetic shuttle is in communication with the magnetic array and subjected to the diamagnetic levitation force from the magnetic array whereby the diamagnetic shuttle levitates above the magnetic array in response to the diamagnetic levitation force;
    a mirror disposed on the diamagnetic shuttle and that receives an incident optical force from the laser light and moves, in response to receipt of the incident optical force, the diamagnetic shuttle in a direction of propagation of the laser light;
    a tiltable platform on which is disposed the magnetic array, such that the magnetic array is interposed between the tiltable platform and the diamagnetic shuttle, wherein the tiltable platform positions the magnetic array at a tilt angle with respect to a reference platform, wherein tilt angle $\beta$ depends on an amount of the incident optical force received by the mirror, and tilt angle $\beta$ changes based on the amount of the incident optical force received by the mirror;
    a photogate comprising an optical source that transmits gate light and a detector that detects the gate light from the photogate and produces a detector signal based on the amount of the gate light detected, wherein the gate light is subject to being blocked by a photo interrupter, the amount of blocking by the photo interrupter being dependent upon the position of the diamagnetic shuttle relative to the photogate as modified by the amount of the incident optical force received by the mirror, such that the detector signal provides a position of the diamagnetic shuttle relative to the tiltable platform; and
    the photo interrupter disposed on the diamagnetic shuttle, and that moves relative to the photogate based on movement of the diamagnetic shuttle, and blocks the gate light as a function of the movement of the diamagnetic shuttle caused by receipt of the laser light by the mirror.

2. The gravity-enforced photon momentum radiometer of claim 1, further comprising a pivot member in mechanical communication with the tiltable platform and interposed between the tiltable platform and the reference platform, such that tiltable platform pivots about the pivot member at tilt angle $\beta$ with respect to reference platform.

3. The gravity-enforced photon momentum radiometer of claim 2, further comprising a height sensor in mechanical communication with the tiltable platform and disposed on an end of the tiltable platform opposing the pivot member, such that the height sensor provides a height signal based on the height h of the tiltable platform with respect to the reference platform.

4. The gravity-enforced photon momentum radiometer of claim 3, further comprising a height adjustment member in mechanical communication with the tiltable platform and disposed on an end of the tiltable platform opposing the pivot member, such that the height adjustment member adjusts the height h of the tiltable platform with respect to the reference platform.

5. The gravity-enforced photon momentum radiometer of claim 4, further comprising a phase sensitive detector in communication with the photogate and that receives the detector signal from the photogate, demodulates the detector signal at a modulation frequency $f_m$, and produces a balanced position signal for the diamagnetic shuttle from the detector signal.

6. The gravity-enforced photon momentum radiometer of claim 5, further comprising an electrical feedback controller in communication with the phase sensitive detector and the height sensor and that receives the balanced position signal from the phase sensitive detector, receives a height signal from the height sensor, produces a height control signal based on the balanced position signal and the height signal, and communicates the height control signal to the height adjustment member, such that the height adjustment member adjusts the height h of the tiltable platform with respect to the reference platform under control of the height control signal from the electrical feedback controller.

7. The gravity-enforced photon momentum radiometer of claim 1, further comprising an air shield in which the magnetic array, the diamagnetic shuttle, the mirror, the tiltable platform, the photogate, and the photo interrupter are disposed.

8. The gravity-enforced photon momentum radiometer of claim 1, wherein the diamagnetic shuttle, the mirror, and the photo interrupter are non-metallic to prevent eddy currents during motion in the magnetic field of the magnetic array.

9. The gravity-enforced photon momentum radiometer of claim 1, wherein the magnetic array comprises a plurality of magnets that provide a nonuniform magnetic field to levitate the diamagnetic shuttle in a vertical direction relative to the reference platform and to constrain motion of the diamagnetic shuttle in a horizontal plane relative to the reference platform.

10. The gravity-enforced photon momentum radiometer of claim 1, wherein the mirror reflects laser light that provides the incident optical force to the diamagnetic shuttle, such that the mirror is highly reflective at the wavelength of the laser light whereby the laser light reflects from the mirror in an absence significant absorption or transmission of the laser light by the mirror that otherwise would produce heat.

11. The gravity-enforced photon momentum radiometer of claim 1, wherein the mirror reflects laser light that provides the incident optical force to the diamagnetic shuttle, and the optical power of the laser light is determined from the mass of the diamagnetic shuttle, the gravitational acceleration of the diamagnetic shuttle, and the tilt angle $\beta$ of the magnetic array.

12. A process for measuring optical power of laser light with a gravity-enforced photon momentum radiometer, the process comprising:
producing a diamagnetic levitation force by a magnetic array of the gravity-enforced photon momentum radiometer, the gravity-enforced photon momentum radiometer comprising:
the magnetic array;
a diamagnetic shuttle disposed proximate to the magnetic array such that the diamagnetic shuttle is in communication with the magnetic array;
a mirror disposed on the diamagnetic shuttle;
a tiltable platform on which is disposed the magnetic array, such that the magnetic array is interposed between the tiltable platform and the diamagnetic shuttle, wherein the tiltable platform positions the magnetic array at a tilt angle β with respect to a reference platform, wherein tilt angle β depends on an amount of the incident optical force received by the mirror, and tilt angle β changes based on the amount of the incident optical force received by the mirror;
a photogate comprising an optical source light and a detector; and
the photo interrupter disposed on the diamagnetic shuttle;
subjecting the diamagnetic shuttle to the diamagnetic levitation force from the magnetic array;
levitating the diamagnetic shuttle above the magnetic array in response to the diamagnetic levitation force;
receiving the laser light by the mirror;
moving, the diamagnetic shuttle, in response to the mirror receiving the incident optical force of the laser light in a direction of propagation of the laser light;
positioning, by the tiltable platform, the magnetic array at a tilt angle β with respect to the reference platform, wherein tilt angle β depends on an amount of the incident optical force received by the mirror;
changing the tilt angle β based on the amount of the incident optical force received by the mirror;
producing, by the optical source of the photogate, gate light modulated at modulation frequency $f_m$;
transmitting, from the optical source of the photo interrupter, the gate light;
moving the photo interrupter relative to the photogate based on movement of the diamagnetic shuttle;
blocking, with the photo interrupter, some or all of the gate light as a function of the movement of the diamagnetic shuttle caused by receipt of the laser light by the mirror;
subjecting the gate light to being blocked by the photo interrupter, such that the amount of blocking by the photo interrupter depends upon the position of the diamagnetic shuttle relative to the photogate as modified by the amount of the incident optical force received by the mirror;
detecting, by the detector of the photogate, the gate light; and
producing, by the detector, a detector signal based on the amount of the gate light detected, such that the detector signal provides the position of the diamagnetic shuttle relative to the tiltable platform; and
determining, from the tilt angle that balances motion of the diamagnetic shuttle, the optical power of the laser light.

13. The process of claim 12, further comprising pivoting the tiltable platform about a pivot member of the gravity-enforced photon momentum radiometer at tilt angle β with respect to reference platform in response to receiving the laser light by the mirror, the pivot member being in mechanical communication with the tiltable platform and interposed between the tiltable platform and the reference platform.

14. The process of claim 13, further comprising providing, by a height sensor, a height signal based on the height h of the tiltable platform with respect to the reference platform, wherein the gravity-enforced photon momentum radiometer further comprises the height sensor in mechanical communication with the tiltable platform and is disposed on an end of the tiltable platform opposing the pivot member.

15. The process of claim 14, further comprising adjusting, by a height adjustment member, the height h of the tiltable platform with respect to the reference platform, wherein the gravity-enforced photon momentum radiometer further comprises the height adjustment member in mechanical communication with the tiltable platform and is disposed on an end of the tiltable platform opposing the pivot member.

16. The process of claim 15, further comprising receiving, by a phase sensitive detector in communication with the photogate, the detector signal from the photogate;
demodulating the detector signal at the modulation frequency $f_m$; and
producing a balanced position signal for the diamagnetic shuttle from the detector signal.

17. The process of claim 16, further comprising:
receiving, by an electrical feedback controller, the balanced position signal from the phase sensitive detector;
receiving, by the electrical feedback controller, a height signal from the height sensor;
producing, by the electrical feedback controller, a height control signal based on the balanced position signal and the height signal;
communicating the height control signal to the height adjustment member from the electrical feedback controller; and
adjusting, by the height adjustment member, the height h of the tiltable platform with respect to the reference platform under control of the height control signal from the electrical feedback controller,
wherein the gravity-enforced photon momentum radiometer further comprises the electrical feedback controller in communication with the phase sensitive detector and the height sensor.

18. The process of claim 12, further comprising protecting, with an air shield of the gravity-enforced photon momentum radiometer, the position of the diamagnetic shuttle from changes caused by fluctuations due to temperature or air movement, wherein the gravity-enforced photon momentum radiometer further comprises the air shield in which the magnetic array, the diamagnetic shuttle, the mirror, the tiltable platform, the photogate, and the photo interrupter are disposed.

19. The process of claim 12, further comprising reflecting, by the mirror, the laser light, such that the mirror is highly reflective at the wavelength of the laser light whereby the laser light reflects from the mirror in an absence significant absorption or transmission of the laser light by the mirror that otherwise would produce heat.

20. The process of claim 12, further comprising determining the optical power of the laser light from the mass of the diamagnetic shuttle, the gravitational acceleration of the diamagnetic shuttle, and the tilt angle β of the magnetic array.

* * * * *